(12) United States Patent
Morr et al.

(10) Patent No.: US 6,847,674 B1
(45) Date of Patent: Jan. 25, 2005

(54) DUAL-FLOW COMMON COMBUSTOR CHEMICAL LASER

(75) Inventors: Gary F. Morr, Thousand Oaks, CA (US); Sheri Woelfle, Highlands Ranch, CO (US)

(73) Assignee: Science Applications International Corporation, San Diego, CA (US)

( * ) Notice: Subject to any disclaimer, the term of this patent is extended or adjusted under 35 U.S.C. 154(b) by 208 days.

(21) Appl. No.: 09/963,486

(22) Filed: Sep. 27, 2001

(51) Int. Cl.⁷ .............................................. H01S 3/095
(52) U.S. Cl. ........................................ 372/89; 372/701
(58) Field of Search .................................... 372/89, 701

(56) References Cited

U.S. PATENT DOCUMENTS

| | | | |
|---|---|---|---|
| 3,688,215 A | | 8/1972 | Spencer et al. ............... 377/89 |
| 3,818,374 A | * | 6/1974 | Emanuel ...................... 372/89 |
| 3,882,416 A | * | 5/1975 | Borghi et al. ................. 372/90 |
| 3,959,741 A | * | 5/1976 | Meinzer ....................... 372/89 |
| 3,991,384 A | * | 11/1976 | Betts ........................... 372/89 |
| 4,000,477 A | * | 12/1976 | Osgerby ....................... 372/89 |
| 4,236,123 A | * | 11/1980 | Richardson et al. ........... 372/89 |
| 4,237,429 A | | 12/1980 | Hook et al. ................... 372/89 |
| 4,307,842 A | * | 12/1981 | Morris ......................... 372/89 |
| 4,348,764 A | * | 9/1982 | Cavalleri et al. ............. 372/89 |
| 4,348,766 A | * | 9/1982 | Born ........................... 372/89 |
| 4,375,687 A | * | 3/1983 | Hook et al. ................... 372/89 |
| 4,517,676 A | * | 5/1985 | Meinzer et al. ............... 372/89 |
| 4,760,582 A | * | 7/1988 | Jeffers ......................... 372/89 |
| 4,785,461 A | * | 11/1988 | Hook et al. ................... 372/89 |
| 5,870,422 A | * | 2/1999 | Florentino et al. ............ 372/89 |
| 6,128,325 A | * | 10/2000 | Goldstein et al. ............. 372/73 |

OTHER PUBLICATIONS

"Amplification of Light" [online], Laser Tutorial, *Web Science Resources,* Copyright 1997 [retrieved on Jun. 19, 2001], pp. 1–2, Retrieved from the Internet: http://members.aol.com/WSRNet/tut/ut1.htm.

"Energizing the Amplifying Medium" [online], Laser Tutorial, *Web Science Resources,* Copyright 1997 [retrieved on Jun. 19, 2001], pp. 1–2, Retrieved from the Internet: http://members.aol.com/WSRNet/tut/ut2.htm.

"Laser Oscillator" [online], Laser Tutorial, *Web Science Resources,* Copyright 1997 [retrieved on Jun. 19, 2001], 1 p., Retrieved from the Internet: http://members.aol.com/WSRNet/tut/ut3.htm.

"Absorption and Emission of Light by Atoms" [online], Laser Tutorial, *Web Science Resources,* Copyright 1997 [retrieved on Jun. 19, 2001], pp. 1–2, Retrieved from the Internet: http://members.aol.com/WSRNet/tut/ut4.htm.

"Creating a Population Inversion" [online], Laser Tutorial, *Web Science Resources,* Copyright 1997 [retrieved on Jun. 19, 2001], pp. 1–2, Retrieved from the Internet: http://members.aol.com/WSRNet/tut/ut5.htm.

* cited by examiner

*Primary Examiner*—Tan Ho
*Assistant Examiner*—James Menefee
(74) *Attorney, Agent, or Firm*—Kilpatrick Stockton LLP

(57) ABSTRACT

The invention herein is directed to a dual-chamber combustion laser assembly having lighter weight (per unit flow area), a more compact, flexible configuration for packaging in spacecraft, aircraft, or ground mobile vehicles, higher mass efficiency from lower heat loss and proven power extraction efficiency of linear lasers, superior output beam quality by incremental compensation of gain medium optical path disturbances and by reduction in time-dependent variations in structural and gain medium characteristics, lower cost and shorter fabrication time for modular dual flow laser and linear optics, more efficient pressure recovery with side-wall isolation nozzles and compact diffuser configurations, and increased small signal gains for more efficient extraction of overtone power.

15 Claims, 9 Drawing Sheets

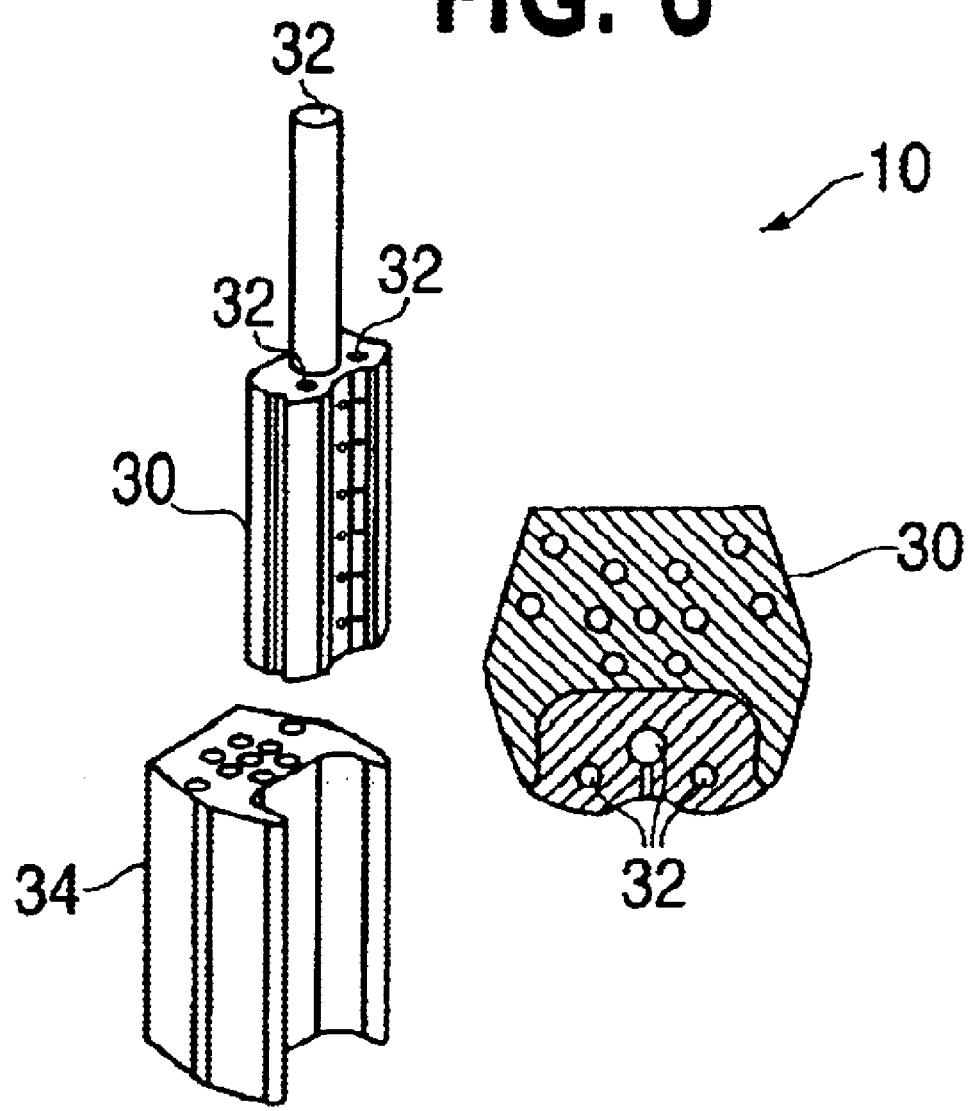

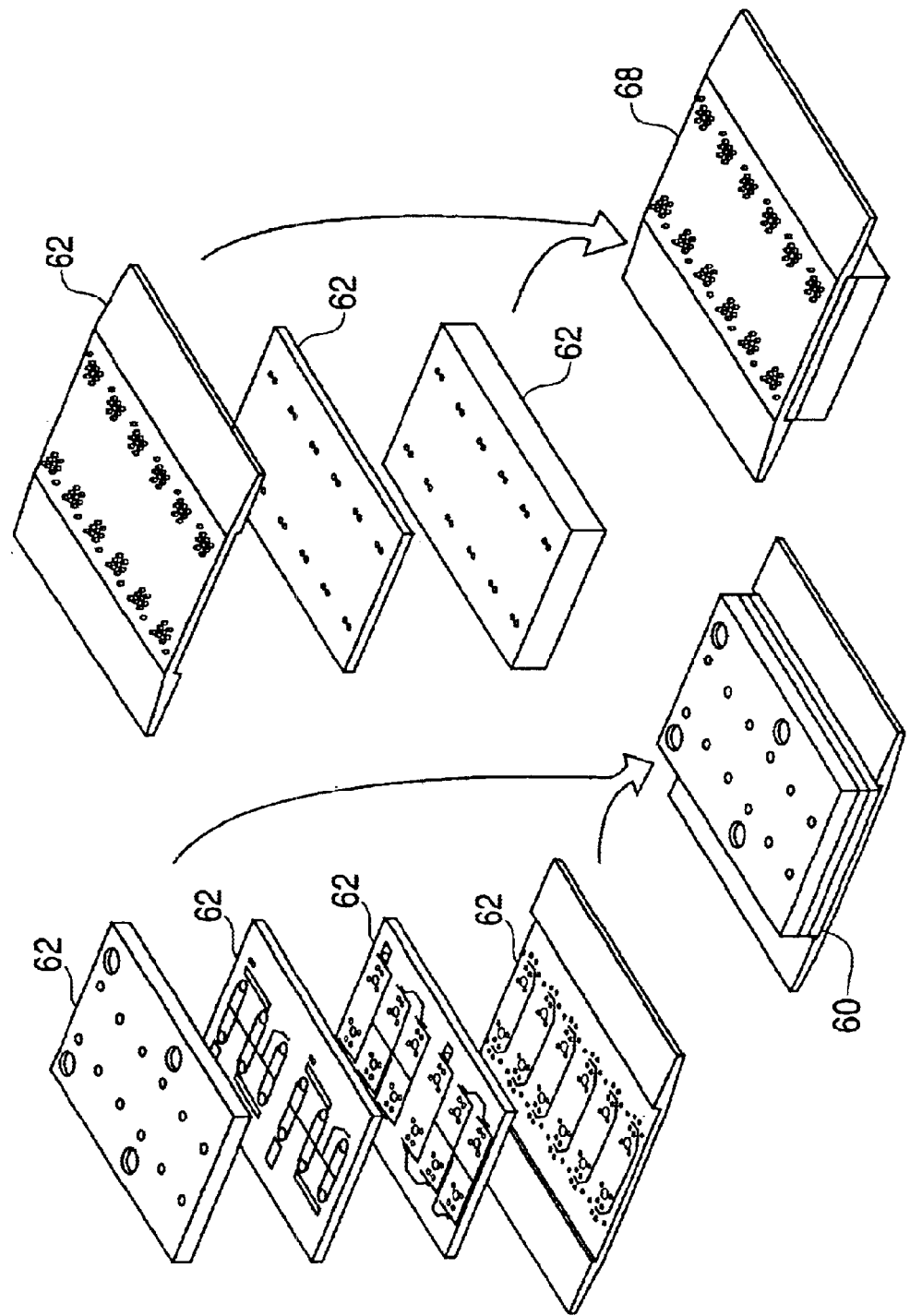

DUAL-FLOW COMMON COMBUSTOR CHEMICAL LASER

BACKGROUND OF THE INVENTION

1. Field of the Invention

The present invention generally involves chemical lasers. More particularly, the present invention involves an improved chemical laser configuration for space and ground applications.

2. Description of the Related Art

Conventional linear lasers provide a single chemical laser gain region from a combustion chamber as shown in FIG. 1. With this configuration, mass efficiency is limited by heat loss to the large surface area i.e., three sides of the combustion chamber. The high weight of the conventional laser is driven by the structural requirement to contain combustion gases at high pressure and high temperature. Finally, the medium quality of the conventional laser is degraded with increasing device length and power due to systematic optical path disturbances in gain medium that cannot be compensated.

The use of a chemical reaction to produce a continuous wave chemically pumped lasing action is well known. The basic concept of such a chemical laser is described, for example, in U.S. Pat. No. 3,688,215, the subject matter of which is incorporated herein by reference. As therein described, the continuous wave chemical laser includes a plenum in which gases are heated by combustion or other means to produce a primary reactant gas containing dissociated atoms of a reactant element such as fluorine mixed with diluting gases, such as helium or nitrogen. The resulting reaction between the hydrogen (or deuterium) and fluorine produces vibrationally excited HF or DF molecules. These molecules are unstable at the low temperature and pressure condition in the cavity and return to a lower vibrational state by releasing photons. Mirrors spaced in the cavity along an axis transverse to the flow field amplify the lasing action from the released photons within the optical cavity formed by the mirrors. The lasing action is of the continuous wave type, which is pumped by the high-energy vibrationally excited molecules formed in the optical cavity. The lasing action depends on producing vibrationally excited states in the HF or DF molecules. This in turn requires that the molecules be formed under conditions of low temperature and pressure. As the pressure and temperature increase, the number of vibrationally excited molecules decreases and more energy goes into translational movement of the molecules, defeating the lasing action.

Cylindrical lasers as illustrated in FIG. 2 provide compact packaging of the gain generator, but require large volumes for handling the radial outflow of laser exhaust gas. End domes are required to contain the combustion products with atomic fluorine in the chamber. The domes are large surface area, heavy structural members that reduce mass efficiency from heat loss effects. Gain medium optical path disturbances increase with cylinder length and cannot be compensated, thereby limiting length and power scaling. Cylindrical combustion devices and optics for power extraction require stringent tolerances during fabrication and alignment, resulting in very high costs for a fragile beam generator. Conventional linear and cylindrical lasers experience large temperature gradients in the structure resulting in time-varying medium quality and laser performance. The radial flow of laser gas lowers the mass flux at the entrance to the diffuser, resulting in lower pressure recovery than linear flow devices.

A low-pressure hydrogen fluoride (HF) laser is a chemical laser, which combines heated atomic fluorine (produced in a combustion chamber similar to the one in a rocket engine) with hydrogen gas to produce excited hydrogen fluoride molecules. The light beam that results radiates on multiple lines between 2.7 μm and 2.9 μm. These wavelengths transmit poorly through the atmosphere. Conventional HF lasers utilize primary nozzles, referred to as hypersonic low temperature or HYLTE nozzles, the surfaces of which are smooth, curved planes that result in nearly parallel flow of gases at the exit of the nozzle. Helium and hydrogen cavity fuel are injected at oblique angles from the nozzle sidewalls. Mixing, reaction and laser gain are produced internal to the primary nozzles and in the downstream optical cavity region. A large base region is formed between adjacent primary nozzles. In a process referred to as helium base purge, helium or other gas must be introduced into these base regions to prevent recirculation of laser gas with ground-state HF that would reduce laser gain and mass efficiency. Conventional HYLTE nozzle configurations wherein hydrogen is injected with wall-jets produces gain internal to the primary nozzle and the large base region between the adjacent primary nozzles is subsonic helium flow that produces no gain. Further, there are flow regions at the laser cavity exit with unmixed atomic fluorine, hydrogen rich regions, and a large subsonic base flow region. These attributes of the conventional HYLTE nozzle result in inefficiencies within the HF laser and a significant loss of power.

There is a need in the art for a laser and nozzle configuration that reduces the inefficiencies currently found in the conventional configurations.

SUMMARY OF THE INVENTION

Summary of the Problem

Available chemical lasers, including linear and cylindrical lasers, have limited mass efficiency due to heat loss and are structurally burdensome and heavy. Power is limited due to optical path disturbances resulting from the need for longer combustion chambers. Further, conventional chemical lasers experience large temperature gradients, which result in time-varying medium quality and reduced laser performance. Finally, available nozzle configurations are in efficient due to a number of non-gain regions resulting therefrom.

Summary of the Solution

An embodiment of the present invention includes a chemical combustion laser component comprising: a first and a second gain region, a combustion region, and a first and a second nozzle blade, wherein the first and second nozzle blades separate the combustion region from the first and second gain regions.

In a further embodiment, each of the first and second nozzle blades is comprised of a primary structure and a secondary structure, wherein the primary structure is formed from a first material and the secondary structure is formed of a second material.

In a yet a further embodiment of the present invention, the second material is able to withstand higher temperatures than the first material.

In yet a further embodiment of the present invention, the first material is aluminum and the second material is nickel.

In yet a further embodiment of the present invention, the first and second nozzle blades are self-cooling.

In still a further embodiment of the present invention a component for a combustion laser comprises: at least one inlet manifold for receiving and distributing combustion fuel; at least one upper manifold sheet having holes therein for receiving combustion fuel from the at least one inlet manifold and further distributing the combustion fuel; at least one pair of nozzle blade structures for receiving the combustion fuel from the at least one upper manifold sheet; and at least one lower manifold sheet, wherein the at least one inlet manifold, the at least one upper manifold sheet, the at least one pair of nozzle blade structures, and the at least one manifold sheet are stacked one on the other and affixed one to the other in a stacked relationship.

In still a further embodiment of the present invention, each of the nozzle blade structures includes a primary nozzle having a serrated tip.

These embodiments result in a combustion laser having lighter weight (e.g., per unit flow area), a more compact, flexible configuration for packaging in spacecraft, aircraft, or ground mobile vehicles, higher mass efficiency from lower heat loss and proven power extraction efficiency of linear lasers, superior output beam quality by incremental compensation of gain medium optical path disturbances and by reduction in time-dependent variations in structural and gain medium characteristics, lower cost and shorter fabrication time for modular dual flow laser and linear optics, more efficient pressure recovery with side-wall isolation nozzles and compact diffuser configurations, and increased small signal gains for more efficient extraction of overtone power.

BRIEF DESCRIPTION OF THE DRAWINGS

In the Figures:

FIG. 6 depicts a nozzle blade structure according to an embodiment of the present invention;

DETAILED DESCRIPTION OF THE INVENTION

Figure 1:
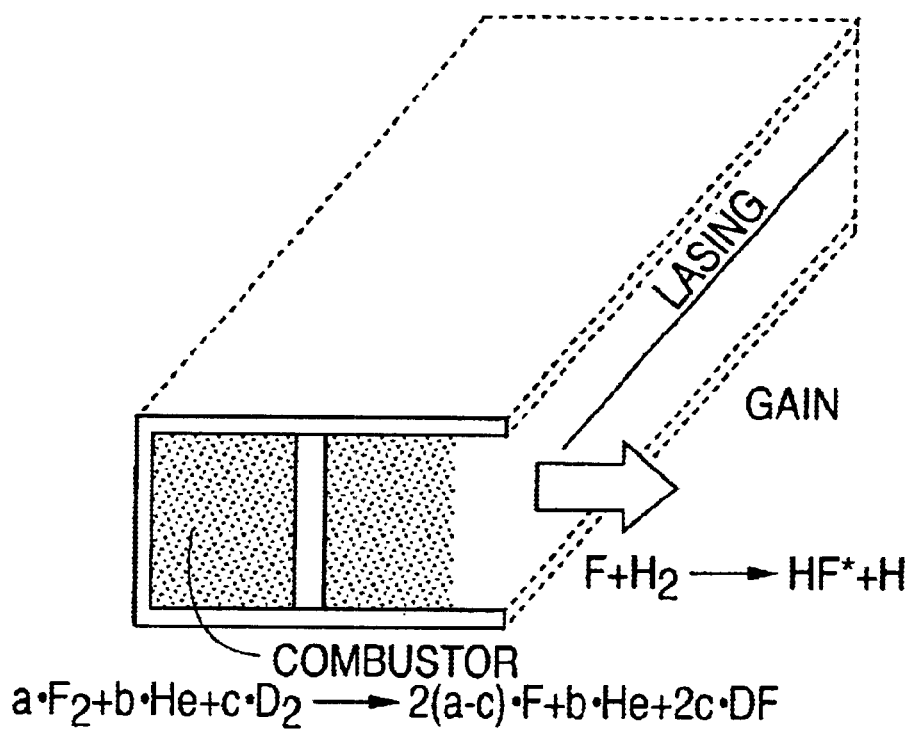
FIG. 1 depicts a conventional linear combustion laser.
Figure 2:
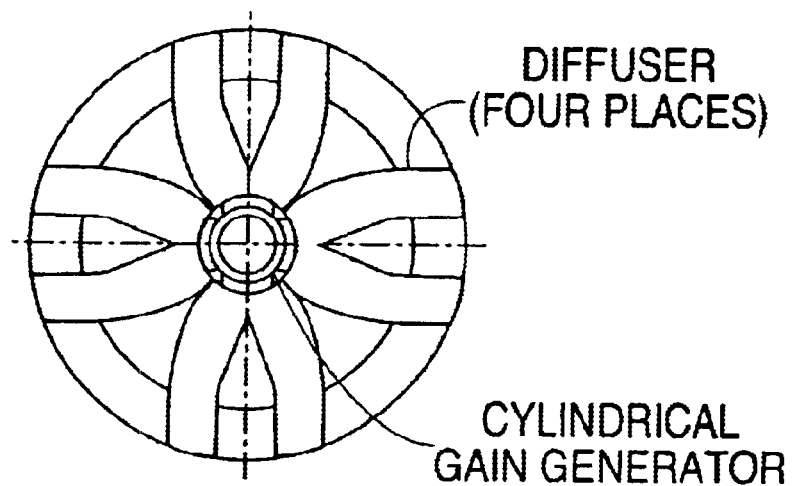
FIG. 2 depicts a conventional cylindrical combustion laser.
Figure 3:
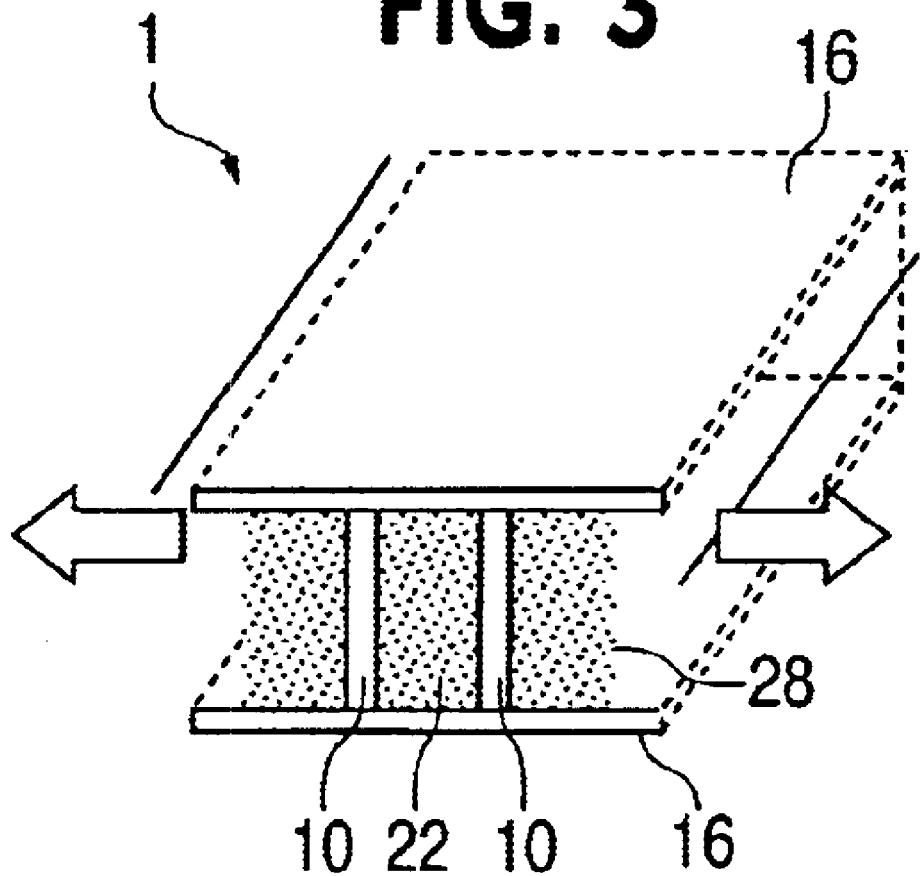
FIG. 3 depicts a dual-chamber combustion laser component according to an embodiment of the present invention.

According to an embodiment of the present invention, a chemical combustion laser is provided having a modular, aluminum design that produces two linear, supersonic gain regions from a single combustion chamber as shown in FIG. 3. This structure results in a minimum surface area combustion chamber and a balanced thermal design. The laser module is referred to herein as a boxer laser module 1. FIG. 3 is an end view of the boxer laser module that includes a combustion chamber 22 and on the left and the right sides, gain regions 28. Gain is produced in the gain regions 28 by the out-flow of combustion products such as, deuterium fluoride, nitrogen, atomic fluorine, and heated helium and by the helium and hydrogen gases injected into the cavity which produce a chemical reaction.

Figure 4:
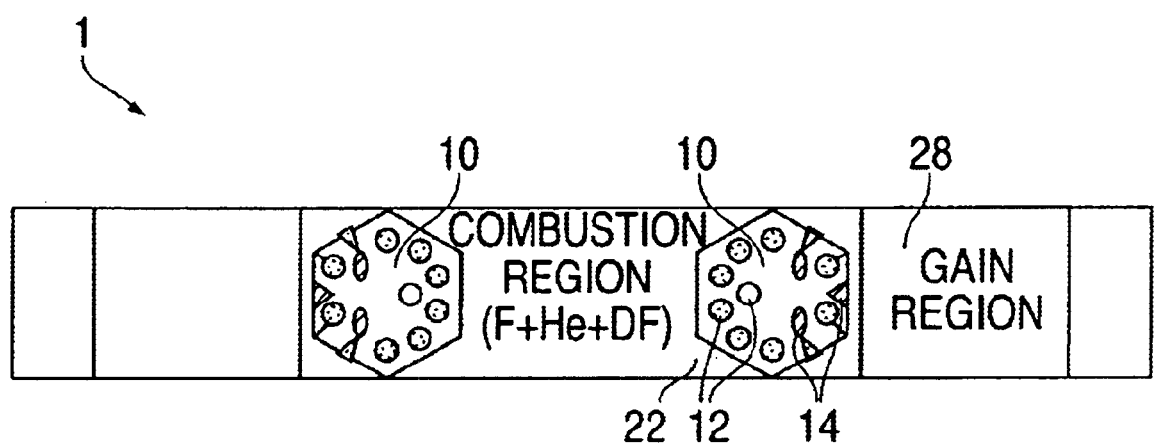
FIG. 4 depicts a dual-chamber combustion laser component according to an embodiment of the present invention.
Figure 5:
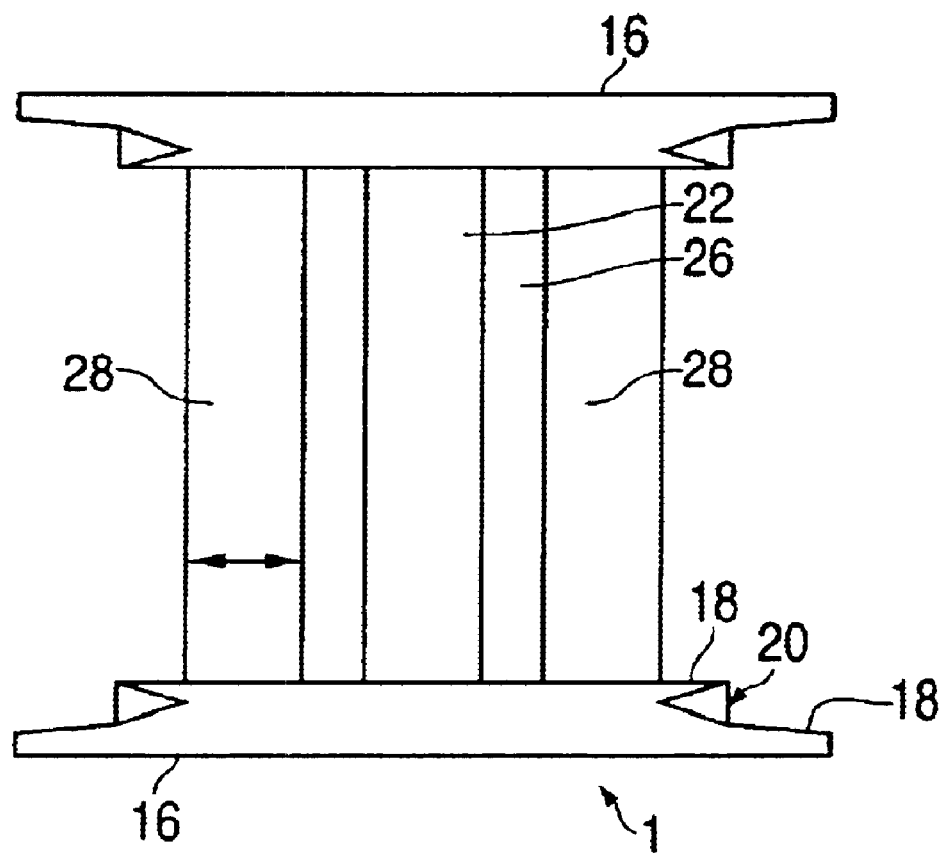
FIG. 5 depicts a dual-chamber combustion laser component according to an embodiment of the present invention.

As shown in FIGS. 4 and 5, each boxer laser module consists of two nozzle blade structures 10 with combustor injectors 12, cavity injectors 14, combustor sidewalls 16 and cavity shrouds 18 with integral cavity isolation nozzles 20. A combustion chamber 22 is formed between two nozzle blade structures 10 connected by combustor sidewalls 16. The nozzle blade structures 10 are self-cooled by gaseous combustor reactants such as, nitrogen trifluoride, deuterium, and helium, which are injected and burned in the combustion chamber 22 to produce, for example, atomic fluorine, deuterium fluoride, nitrogen, and heated helium and by cavity injectant gases, hydrogen and helium. Boxer laser modules 1 are placed side-by-side to increase the length of the combustion chamber 22 and to form converging-diverging primary nozzles 26 between adjacent nozzle blade structures 10. Combustion product gases, e.g., atomic fluorine, deuterium fluoride, nitrogen and helium, are expanded through these primary nozzles 26 from a high-pressure of approximately 0.5 atmospheres, a high-temperature of, e.g., approximately 1500K to 1700K condition to a low pressure of approximately 0.005 atmospheres, supersonic, e.g., Mach number of 3 to 5 condition, where cavity fuel, e.g., hydrogen and helium gas mixtures, is injected to produce laser gain. The heat is transferred to the combustor sidewalls 16 and by making the chamber length short, all of the heat that is transferred to the combustor sidewalls 16, even in the case of a small quantity, can be conducted to the nozzle blade structures 10 and cooled. The nozzle blade structures 10, combustor sidewalls 16, and cavity shrouds 18 are designed to achieve dynamic and static thermal balance conditions. This thermal balance condition results in equal heating rates and nearly equal steady-state temperatures for nozzle blade structures 10, combustor sidewalls 16, and cavity shrouds 18. Uniform heating and isothermal steady-state temperatures of the boxer modules 24 results in nearly time-constant combustor pressure and laser cavity flow conditions to maintain desired conditions for laser power and medium quality. According to this embodiment, all parts of the boxer laser module 1 can be heated at a nearly equal rate and operate at nearly equal steady state temperature, such that the throat gap of the primary nozzle 26 which is formed between side-by-side boxer laser modules 1 remains constant. If the throat gap remains constant, all of the properties in the laser gain region 28 remain time-independent and increase the efficiency of the gain regions 28. This is important to efficient gain production, efficient power extraction, and the medium quality that is required for a high-power laser.

FIG. 5 is a side view of a boxer laser module 1. The boxer laser module 1 incorporates isolation nozzles 20 in the cavity shrouds 18 downstream of the laser gain regions 28. In an exemplary embodiment, helium is injected through the nozzles to energize flow along the cavity shrouds 18 to allow formation of strong shock waves just downstream of the laser gain regions 28 for efficient pressure recovery with compact diffuser configurations. Diffuser lengths can be factors of three to five times shorter than for conventional linear lasers when using the boxer laser modules 1 described above. The placement of the isolation nozzles 20, ensures that the gain regions 28 are independent of their environment. Utilizing a boxer laser comprised of the boxer laser modules 1 having a single minimum surface area combustor region 22 which produces laser gain regions 28 described above, the structural weight to support the combustor is minimized, the heated surface area is minimized, and thereby heat loss to the combustor which drives mass efficiency is minimized. The boxer laser configuration described herein minimizes non-functional structure and facilitates incremental production of very long gain paths, such as those required for an overtone laser.

According to an embodiment of the present invention, FIG. 6 illustrates a nozzle blade structure 10 configuration for reducing heat loss. Combustor injector triplets 32 are incorporated into secondary structure 30 made of high temperature fluorine-compatible material such as nickel, stainless steel, or ceramics like lanthanum hexaboride or alumina. Referring to FIG. 6, the secondary structure 30 fits into the primary structure 34 which is formed of a lightweight material such as aluminum. By making the secondary structure 30 out of high temperature fluorine-compatible material as opposed to aluminum, the secondary structure 30 can operate at significantly higher temperatures of e.g., 900K to 1300K, as compared to the safe operating temperature of 600K for aluminum. The secondary structure 30 is inserted into the primary structure 34 of the nozzle blade structure 10 in order to reduce heat transfer that would otherwise occur when operating with wall temperatures higher than allowed for an all aluminum nozzle blade structure. The secondary structure 30 is cooled by injected combustor reactants such as, nitrogen trifluoride, deuterium and helium and by conduction to the primary structure 34 that is cooled by the cavity injected hydrogen and helium. In a further embodiment of the present invention, the above-identified combustor reactants as well as cavity injectants hydrogen and helium are transferred from at least one boxer laser module 1 to at least one adjacent boxer laser module 1 for cooling and for injection into the combustor 22 and cavity flow.

Figure 7A:
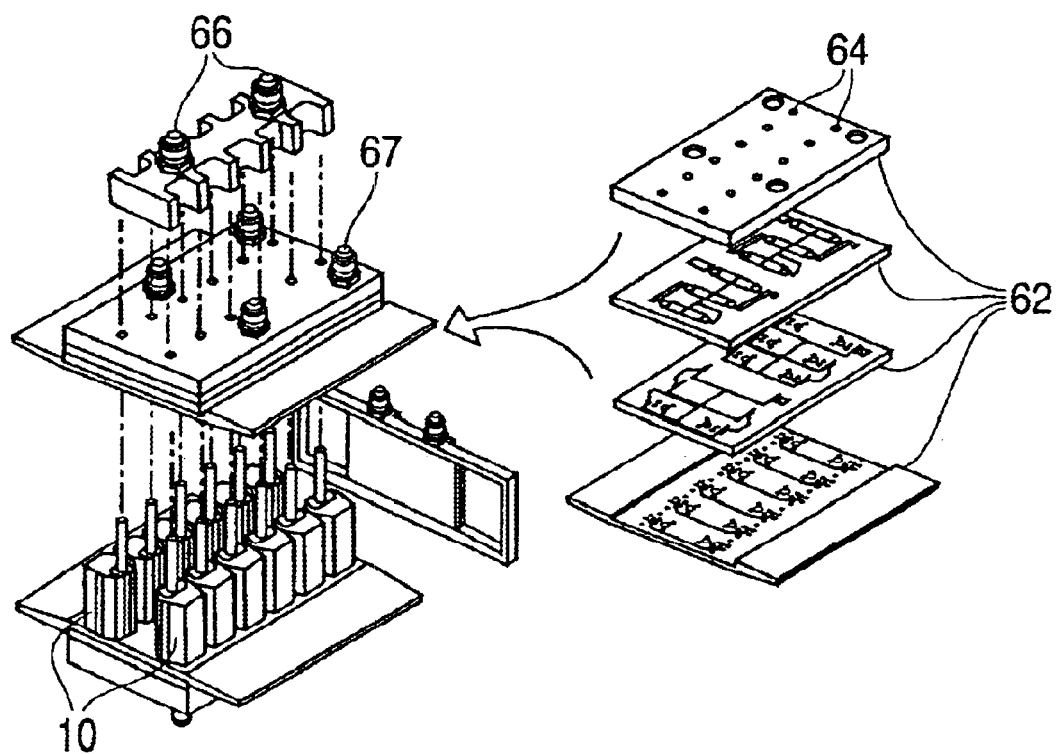
FIGS. 7(a) and (b) depict a manifold assembly according to an embodiment of the present invention.

In an embodiment of the present invention, the nozzle blade structures 10 and consequently, the boxer laser modules 1, are connected by a thin, laminated manifold assembly 60 as shown in FIGS. 7(a) and 7(b). The thin manifold sheets 62 have flow channels 64 machined into their surfaces to provide gas flow passages from oxidizer inlet manifolds 66 to coolant and distribution passes (not shown) internal to the nozzle blade structures 10. The manifold sheets 62 also contain and connect combustor fuel inlet manifolds 67 for facilitating the efficient conduction of fuel to the nozzle blade structures 10. The manifold sheets 62 are joined together by brazing, diffusion bonding, or the like in order to form upper and lower manifold assemblies 60 and 68 on the top and bottom surfaces of the nozzle blades 10. This configuration places parent material, e.g., aluminum, with no bond joints, between the oxidizer and the combustion fuels to eliminate the possibility of interpropellant leakage that could cause failure. This configuration also reduces the number of external connections that have to be made to the hardware.

Figure 8:
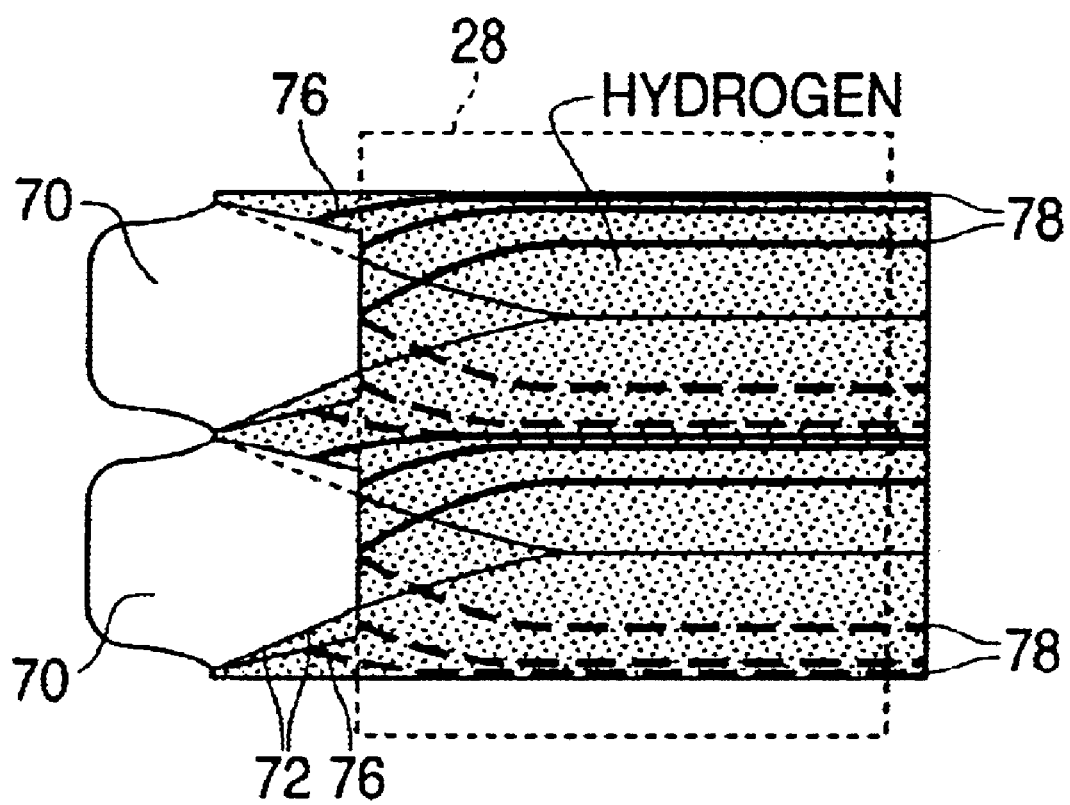
FIG. 8 depicts a nozzle blade according to an embodiment of the present invention.

In a further embodiment of the present invention, nozzle blade structures 10 as described in relation to FIG. 6, increase laser chemical efficiency when used in, for example, HF (Helium Fluoride), HF-overtone, DF (Deuterium Fluoride), and gaseous iodine combustion driven lasers and increase the small signal gain for more efficient extraction of power. Referring to FIG. 8, a nozzle blade 70 according to an embodiment of the present invention has serrated primary nozzle surfaces 72 to direct primary nozzle flow into the region 74 between primary nozzles. Cavity fuel, e.g., helium gas 76 and hydrogen gas 78, is injected from the base region through pairs of nozzles that enhance molecular mixing and prevent recirculation of laser gas. Further, a secondary flow of atomic fluorine, is injected into the laser cavity between adjacent pairs of nozzles by means of the serrated primary nozzle surfaces in order to control the flow trajectory of the cavity fuel. This nozzle configuration eliminates the gas flow normally required for base purge, simplifies the design and fabrication of the nozzles, and increases overall mass efficiency of the laser by utilizing all of the cavity area 28 to produce gain. In this embodiment of the present invention, the placement of nozzle blades at the base, allows the laser to filly utilize a conventionally inactive zone that occupies approximately 40 percent of the length of gain region. By injecting the fuel internal to the nozzle, the expansion that the fuel will undergo in the cavity is limited. Referring to helium and hydrogen flow jet patterns 76 and 78, respectively, complete use of the laser gain region 28 is illustrated.

Figure 9:
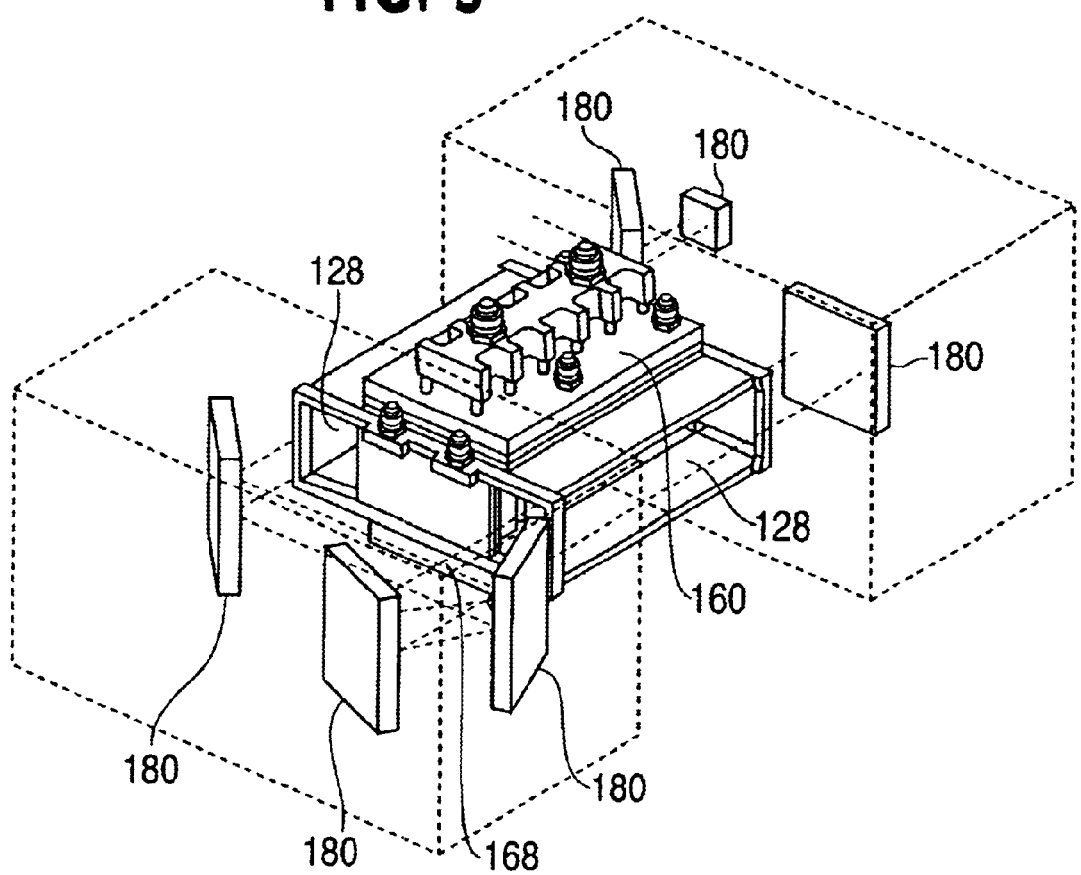
FIG. 9 depicts a combustion laser assembly according to an embodiment of the present invention.

In a further embodiment of the present invention, the components described above are assembled into a boxer laser 100 as shown in FIG. 9. At least one boxer laser module is contained in a housing comprised of upper and lower manifold assemblies 160 and 168 surrounded by enclosed gain regions 128. The at least one boxer laser module comprises the boxer laser 100 along with a surrounding optical train comprised of various optical elements (e.g., mirrors, reflectors, beamsplitters, lenses, switches, and the like) 180. One skilled in the recognizes the necessity for optical elements and the many configurations of optical elements available for use within a combustion laser.

The embodiments described herein are intended to be exemplary, and while including and describing the best mode of practicing, are not intended to limit the invention. Those skilled in the art appreciate the multiple variations to the embodiments described herein, which fall within the scope of the invention.

What is claimed is:

1. A component for a combustible laser comprising:
   a first and a second gain region;
   a combustion region; and
   a first and a second nozzle blade, wherein the first and the second nozzle blades separate the combustion region from the first and second gain regions; and
   further wherein each of the first and second nozzle blades is comprised of a primary structure and a secondary structure.

2. The component according to claim 1, wherein the primary structure is formed from a first material and the secondary structure is formed of a second material.

3. The component according to claim 2, wherein the second material is able to withstand higher temperatures than the first material.

4. The component according to claim 2, wherein the first material is aluminum.

5. The component according to claim 2, wherein the second material is selected from the group consisting of nickel, stainless steel, lanthanum hexaboride and alumina.

6. The component according to claim 1, wherein the first and second nozzle blades are self-cooling.

7. The component according to claim 1, wherein the first and second nozzle blades are serrated.

8. The component according to claim 1, wherein the secondary structure is cooled by at least one injected combustor reactant.

9. The component according to claim 8, wherein the at least one injected combustor reactant is selected from the group consisting of nitrogen, trifluoride, deuterium and helium.

10. A component for a combustion laser comprising:
    at least one inlet manifold for receiving and distributing combustion fuel;
    at least one upper manifold sheet having holes therein for receiving combustion fuel from the at least one inlet manifold and further distributing the combustion fuel;

at least one pair of nozzle blade structures for receiving the combustion fuel from the at least one upper manifold sheet; and at least one lower manifold sheet, wherein the at least one inlet manifold, the at least one upper manifold sheet, the at least one pair of nozzle blade structures, and the at least one manifold sheet are stacked one on the other and affixed one to the other in a stacked relationship.

11. The component according to claim 10, wherein each of the nozzle blade structures includes a primary nozzle having a serrated tip.

12. The component according to claim 11, wherein the primary nozzle is enclosed in a cavity shroud so as to facilitate the injection of an isolation gas downstream of a laser cavity in order to isolate the laser cavity from downstream pressure disturbances.

13. The component according to claim 12, wherein the isolation gas is helium.

14. A laser comprising:

at least two combustion modules, wherein the at least two combustion modules each include a combustion region and two gain regions such that the combustion region is separated on two sides from the two gain regions via two nozzles structures; and further wherein the at least two combustion modules are adjacent to one another such that the combustion region, the two gain regions, and the two nozzle structures for each of the at least two combustion modules are aligned.

15. The laser according to claim 14, further comprising a manifold assembly for aligning and attaching the at least two combustion modules within the laser, wherein the manifold assembly comprises:

at least one inlet manifold for receiving and distributing combustion fuel;

at least one upper manifold sheet having holes therein for receiving combustion fuel from the at least one inlet manifold and further distributing the combustion fuel to the at least two combustion modules; and at least one lower manifold sheet, wherein the at least one inlet manifold, the at least one upper manifold sheet, the at least two combustion modules, and the at least one manifold sheet are stacked one on the other and affixed one to the other in a stacked relationship.

* * * * *